W. F. SPRICK.
DEFLATING DEVICE.
APPLICATION FILED JUNE 20, 1913.
1,077,011.
Patented Oct. 28, 1913.
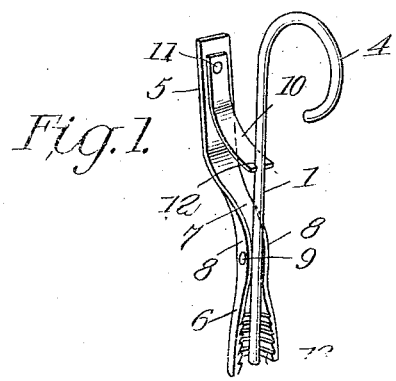
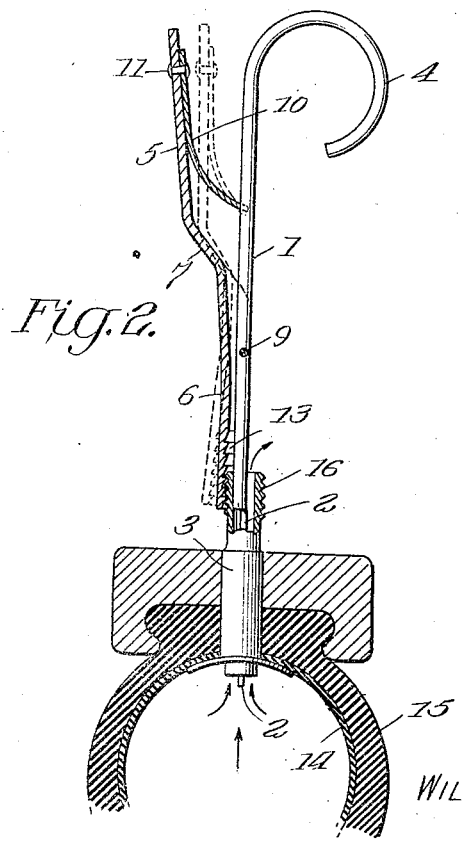
WITNESSES
INVENTOR
WILLIAM F. SPRICK
BY
ATTORNEYS

UNITED STATES PATENT OFFICE.

WILLIAM FREDRICK SPRICK, OF STICKNEY, SOUTH DAKOTA.

DEFLATING DEVICE.

1,077,011.  Specification of Letters Patent.  Patented Oct. 28, 1913.

Application filed June 20, 1913. Serial No. 774,833.

*To all whom it may concern:*

Be it known that I, WILLIAM F. SPRICK, a citizen of the United States, and a resident of Stickney, in the county of Aurora and State of South Dakota, have invented a new and useful Improvement in Deflating Devices, of which the following is a specification.

My invention is an improvement in deflating devices for use with the air valves of pneumatic tires, wherein means is provided for opening the valve, and having means in connection therewith for gripping the threads of the valve casing to hold the valve open to permit the air to discharge therefrom.

In the drawings:—Figure 1 is a perspective view of the device, and Fig. 2 is an enlarged longitudinal section, showing the device in operation.

The present embodiment of the invention comprises a rod or plunger 1, having one of its ends cut square across to form a plane surface at right angles to the axis of the plunger for engaging the stem 2 of the air relief valve in the casing 3. The opposite end of the rod or plunger is bent to form a hook or handle 4 as shown.

A plate consisting of two portions 5 and 6 offset laterally with respect to each other and connected by a connecting portion 7 is provided for coöperating with the plunger. At the junction of the portions 6 and 7, the side edges of the plate are bent laterally to form flanges 8, and the plunger 1 is arranged between the said flanges and is pivotally connected to the plate by means of a pivot pin 9, the said pin passing through the flanges 8 and the plunger.

A plate spring 10 has one of its ends connected to the upper end of the portion 5 of the plate, by means of a rivet 11, and the lower end of the plate is curved toward the plunger and is provided with a notch or recess 12, for receiving the plunger. The spring normally acts to press the lower end of the plunger toward the portion 6 of the plate and the said portion 6 of the plate is arched transversely away from the plunger, and is provided on its inner face with a transverse series of ribs or teeth 13, the said ribs or teeth facing upwardly as shown.

The device is intended for use with pneumatic tires as for instance of the character shown in Fig. 2, wherein the inner casing 14 of the tire is arranged within the shoe 15, and is provided with the valve casing 3, having its outer end threaded as indicated at 16 to receive a holding cap, not shown. The teeth or ribs 13 are spaced to correspond roughly with the pitch of the threads 16, so that the said teeth will engage with the threads to prevent the plate from movement away from the valve casing. Whenever it is necessary to remove a pneumatic tire from the rim, for repairs or the like, the tire must first be deflated in order to permit the removal. This operation is as a rule, done by the pin provided on the cap which closes the end of the valve casing. The operator must however, hold the valve open until the tire is deflated, an operation requiring a considerable length of time. The present device is adapted to permit this operation to take place without other assistance from the operator than the placing of the device in place. When it is desired to deflate the tire, the cap, not shown, is removed, and the operator grasps the deflating device, pressing the portion 5 of the plate toward the hook or handle 4, as indicated in dotted lines in Fig. 2. This action presses the portion 6 of the plate away from the adjacent end of the plunger and with the device so held the plane end of the plunger is inserted in the outer end of the casing to engage the valve stem and to open the valve. As soon as the valve is open, the portion 5 of the plate is released, and the spring 10 forces the portion 6 of the plate into contact with the threads 16 of the valve casing. The teeth or ribs 13 engage the threads of the valve casing and hold the device in place with the valve open. When the tire has been deflated, the portion 5 of the plate is pressed toward the handle 4, thus releasing the teeth 13 from the threads 16 and permitting the removal of the deflating device.

I claim:—

1. A deflating device for use with the air valves of pneumatic tires, comprising in combination a plunger rod having one end adapted to enter the valve casing and engage the stem of the valve to open the same, said plunger having at the other end a hook or handle, a plate having its side edges flanged intermediate its ends, the plunger rod being received between the flanges, a pivot pin pivotally connecting the plunger to the flanges, the lower end of the plate extending to approximately the lower end of the plunger and the said lower end of the plate being curved transversely and arranged with its concave face toward the plunger, said face having a series of transverse ribs or teeth facing the opposite end of the plunger and adapted to engage the threads of the valve casing to hold the plunger in place, and a plate spring secured at one end to the plate at the end remote from the teeth, said spring being curved toward the plunger and having a notch at its free end for receiving the plunger and acting normally to press the toothed end of the plate toward the plunger.

2. A deflecting device for use with the air valves of pneumatic tires, comprising in combination a plunger rod having one end adapted to enter the valve casing and engage the stem of the valve to open the same, a plate having its side edges flanged intermediate its ends, the plunger rod being received between the flanges, a pivot pin pivotally connecting the plunger to the flanges, the lower end of the plate extending to approximately the lower end of the plunger and the said lower end of the plate being curved transversely and arranged with its concave face toward the plunger, said face having a series of transverse ribs or teeth facing the opposite end of the plunger and adapted to engage the threads of the valve casing to hold the plunger in place, and a spring normally pressing the toothed end of the plate toward the plunger.

3. A deflating device comprising a plunger rod for insertion in the air valve of the pneumatic tire to engage the stem to open the valve, a plate pivoted intermediate its ends to the plunger, the lower end of the plate being curved transversely to fit the periphery of the valve casing and being provided on its inner face with teeth for engaging the threads of the casing to prevent movement of the plate away from the casing, and a spring normally pressing the toothed end of the plate toward the plunger.

WILLIAM FREDRICK SPRICK.

Witnesses:
O. E. O'BRIEN,
M. M. MILLS.